(12) United States Patent
Kannermark et al.

(10) Patent No.: US 8,964,113 B2
(45) Date of Patent: Feb. 24, 2015

(54) METHOD AND ARRANGEMENT IN A MONITORING CAMERA

(71) Applicant: AXIS AB, Lund (SE)

(72) Inventors: Per Kannermark, Malmo (SE); Andreas Nilsson, Haljarp (SE)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 14/043,595

(22) Filed: Oct. 1, 2013

(65) Prior Publication Data

US 2014/0098286 A1    Apr. 10, 2014

Related U.S. Application Data

(60) Provisional application No. 61/709,351, filed on Oct. 4, 2012.

(30) Foreign Application Priority Data

Oct. 1, 2012   (EP) ..................................... 12186789

(51) Int. Cl.
*H04N 5/225* (2006.01)
*H04N 5/232* (2006.01)

(52) U.S. Cl.
CPC ................................. *H04N 5/23241* (2013.01)
USPC ......................................................... 348/372

(58) Field of Classification Search
None
See application file for complete search history.

(56) References Cited

U.S. PATENT DOCUMENTS

| | | |
|---|---|---|
| 2008/0052546 A1 | 2/2008 | Schindler et al. |
| 2012/0051714 A1 | 3/2012 | Reimnitz |
| 2014/0098286 A1 | 4/2014 | Kannermark et al. |

FOREIGN PATENT DOCUMENTS

| | | |
|---|---|---|
| EP | 2 177 970 A1 | 4/2010 |
| JP | 11-337148 A | 12/1999 |
| JP | 2002-010243 A | 1/2002 |
| WO | WO 94/03014 | 2/1994 |

OTHER PUBLICATIONS

European Search Report issued Mar. 13, 2013 in European Patent Application No. 12186789.9-1902, 7 pages.
Japanese Office Action mailed Aug. 27, 2014, in Japanese Patent Application No. 2013-206012 (7 pages).

*Primary Examiner* — Twyler Haskins
*Assistant Examiner* — Angel L Garces-Rivera
(74) *Attorney, Agent, or Firm* — Oblon, Spivak, McClelland, Maier & Neustadt, L.L.P.

(57) ABSTRACT

A monitoring camera is connected to an external power source. The external power source has an external maximum power level. Image data is being processed in a first processing state. The monitoring camera detects (202) an event and determines (206) a type of the detected event. An amount of energy in an energy accumulator is determined (208) in the monitoring camera. Based on the type of the event and based on the external maximum power level and based on the determined amount of energy in the energy accumulator, a second processing state is determined (210). The second processing state requires a power level that is higher than the external maximum power level. Image data is then processed (212) in the second processing state.

8 Claims, 3 Drawing Sheets

METHOD AND ARRANGEMENT IN A MONITORING CAMERA

TECHNICAL FIELD

Embodiments herein relates generally to a monitoring camera and a method therein. In particular it relates to saving power in the monitoring camera.

BACKGROUND

Monitoring cameras are installed in various places today. Monitoring cameras are installed both indoor and outdoor as well as on permanent and temporary installations. Depending on where a monitoring camera is installed and depending on the conditions under it is to be operated, there will be a very large variation with regard to the image processing capabilities that are required of the camera. For example, monitoring of a location in which during daytime images of a large number of passing objects are to be processed requires much image processing power. This contrasts to a situation where the same location is monitored during night time when no objects are passing in the field of view of the camera. Moreover, due to the fact that image detectors/sensors become more and more refined, and deliver ever increasing flows of image data, the requirements on the processing power of monitoring cameras will continue to increase. Such an increased need for processing power will typically be associated with increased electric power consumption in the camera.

Power consumption is always an issue in all electronic products including monitoring cameras. There are several reasons for that, such as environmental reasons but there are also other reasons. One such reason could be when a large number of cameras are installed on a temporary basis, e.g. monitoring a sports event. In this case it could be costly to make a proper installation of electrical power from the power grid. One solution to this problem would be to use Power over Ethernet, PoE, which has a limited maximum power output. Another example of when the power consumption would be an issue could also be because the heat the image processing circuitry create cannot be taken care of and, as a consequence, the processing circuitry cannot be used the way it is needed to process the image.

In other words, there are several scenarios where the power supplied to the monitoring camera will be insufficient to handle all processing requirements in the monitoring camera.

For example, with regard to the example of PoE, there are different classes of PoE and in some situations the monitoring camera has too low class to be able to deal with what is happening in the scene monitored by the monitoring camera. For example, having the monitoring camera at home a lot of the times nothing happens, and a low class of PoE is may be used. However, when something happens you want to be able to use a high amount of effect, which you probably will not have with a low class of PoE.

WO 94/03014 A1 describes a low power video security monitoring system. When motion is detected by a video camera the system establishes a connection with a video monitoring facility and transmits compressed video images to the facility.

EP 2177970 A1 describes power management in an electronic device. The device comprises a flash unit and a camera. A battery level is measured before a decision is made whether or not to utilize the flash when taking a photograph.

SUMMARY

It is therefore an object of the present invention to at least mitigate drawbacks associated with processing power requirements in relation to a limited power supply in a monitoring camera.

Hence, according to a first aspect there is provided a method for controlling a monitoring camera. The monitoring camera is connected to an external power source. The external power source has an external maximum power level. Image data is being processed in a first processing state. The monitoring camera detects an event and determines a type of the detected event. An amount of energy in an energy accumulator is determined in the monitoring camera. Based on the type of the event and based on the external maximum power level and based on the determined amount of energy in the energy accumulator, a second processing state is determined. The second processing state requires a power level that is higher than the external maximum power level. Image data is then processed in the second processing state.

In other words, such a method has an effect in that it enables a monitoring camera having a limited electric power supply to perform high performance image processing that requires an electric power level that exceeds the limited power supply level. An advantage is therefore that the processing capacity of the monitoring camera can be increased above the limit corresponding to an electric power limit that a power supply normally can provide.

Energy is provided to the energy accumulator at a power level corresponding to the difference between the external maximum power level and a power level of the first processing state, and discontinuing the provision of energy to the energy accumulator as a consequence of the detection of the event.

This enables re-charging of an energy accumulator during periods when the monitoring camera does not need all available power that can be provided by the external power source. An advantage of this is that the service intervals relating to the battery replacement can be extended.

Since the monitoring camera is able to use power from both an external power source and from the power accumulator, the monitoring camera is able to do more processing and thereby increase the quality of the image data when needed.

Embodiments include those that comprise obtaining a time interval that is required for the second processing state, and wherein determining the second processing state is further based on the time interval. In such embodiments, the time interval can be based on the type of the detected event.

The determination of the second processing state can in some embodiments comprise calculating the time interval for the second processing state by dividing the amount of energy in the energy accumulator by the difference between the power level required for the second processing state and the external maximum power level.

That is, some embodiments enable optimization of the amount image processing that can be performed as a consequence of the event detection.

Some embodiments are such that the detection of an event comprises detection of motion in a scene that is being monitored, e.g. by identifying motion in the image data.

Embodiments include those where the determination of the type an event comprises detecting a predetermined object type in the image data.

Embodiments include those where the first processing state comprises processing image data according to any first frame rate, noise filtering level, tone mapping level, sharpening level, color correction level, artifact reduction level, and wherein the second processing state comprises processing image data according to any second frame rate, noise filtering level, tone mapping level, sharpening level, color correction level, artifact reduction level, being lower than the corresponding first rate and level.

According to a second aspect there is provided a monitoring camera corresponding to the method.

According to a third aspect there is provided a computer program product loadable into a memory of a computerized device and comprising software code portions adapted for performing the method as summarized above.

The effects and advantages of the second and third aspects correspond to those summarized above in connection with the first aspect.

BRIEF DESCRIPTION OF THE DRAWINGS

Examples of embodiments herein are described in more detail with reference to attached drawings in which.

DETAILED DESCRIPTION

Figure 1:
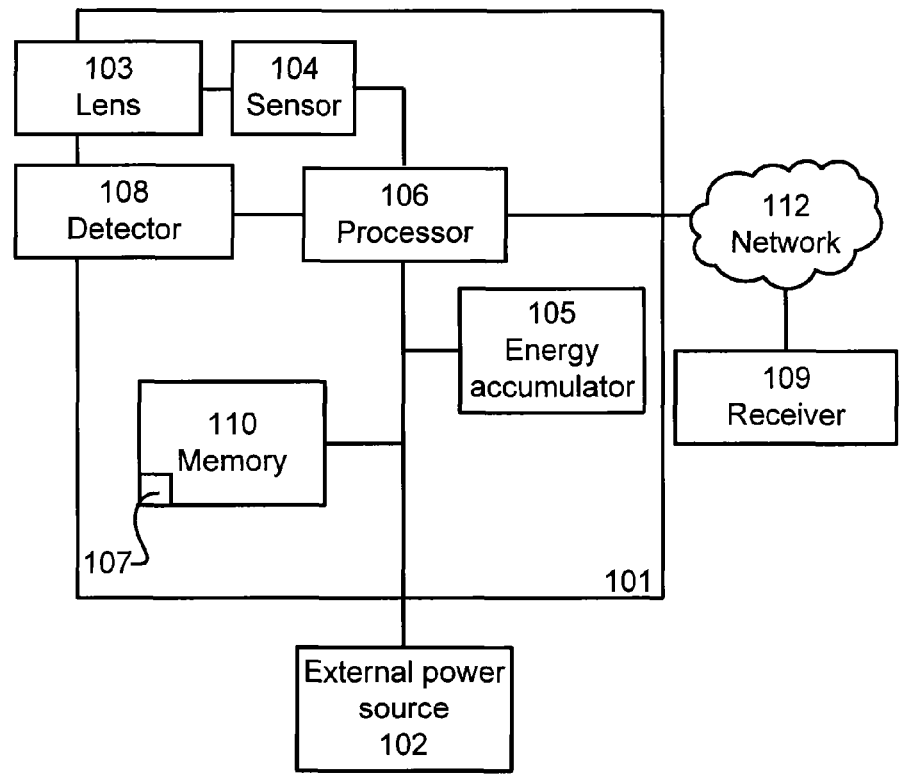
FIG. 1 is a schematic block diagram illustrating a monitoring camera.

FIG. 1 illustrates a block diagram according to embodiments of the invention. A monitoring camera 101 is adapted to monitor a scene, not illustrated in the figure. The monitoring camera 101 may be a permanent monitoring camera or installed on temporary basis as described in the background.

The camera 101 can be any suitable digital camera capable of generating video sequences and communicating the video sequences, or other type of image data, such as image and video metadata, over a network 112 to any entity connected to the network, such as an image data receiver 109. The camera 101 comprises a lens system 103 for collecting incident light, an image sensor 104, for example in the form of a charge coupled device, CCD, a CMOS-sensor or similar sensor, for registering incident light, as well as circuitry as is known in the art. For example, the circuitry typically includes image processing circuitry that comprises an image/video encoder (implemented in hardware, software, or any combination thereof) that form part of a processing unit 106 that manages, for example video analytics, memory 110, and network interface circuitry (not shown) for connection to the network 112. The image processing unit 106 comprising the image/video encoder is arranged to encode captured digital image data into any one of a plurality of known formats for continuous video sequences, for limited video sequences, for still images or for streamed images/video. For instance, the image data may be encoded into MPEG1, MPEG2, MPEG4, H.264, JPEG, M-JPEG, bitmapped, etc. Moreover, the image data may be processed by using techniques such as noise filtering, tone mapping, sharpening, color correction and artifact reduction. As will be discussed below these processing techniques typically involve complex processing tasks and as such makes the load on the processor 106 higher than during performance of simple tasks, and thereby increase the power consumption of the monitoring camera 101. The controller 106 may also comprise analytics circuits and software to detect motion or objects in the image data.

Software instructions 107 stored in the memory 110 are configured to control the camera 101 and its interaction with any other entities connected via the network 112 and implement, when executed by the processor 106 and in combination with the hardware units, embodiments of the methods described herein.

The monitoring camera 101 is supplied with electrical power from an external power source 102. The power may be supplied by means of power over Ethernet, PoE, universal serial bus, USB, or from any other appropriate power source known to the skilled person. The power supplied by the external power source 102 is limited by an upper bound. This upper bound will be called external maximum power level in this disclosure.

The monitoring camera 101 comprises or may be connected to an energy accumulator 105. The energy accumulator 105 is adapted to store electrical energy which may be used by the monitoring camera 101 when needed. The energy accumulator 105 may be built in the monitoring camera 101 or may be connected to the monitoring camera 101. The energy accumulator may be either chargeable or non-chargeable. Examples of energy accumulators 105 may be a battery, a capacitor etc. The energy accumulator 105 may hold different amounts of electrical energy depending on how fully charged it is. The electrical power from the energy accumulator 105 may be added to the electrical power provided from the external power source 102 such that the total amount of electrical power supplied to the monitoring camera 101 is higher than the external maximum power level. If the energy accumulator 105 is chargeable, it may be charged with electrical power from the monitoring camera 101 when the power consumption of the camera 101 is less than the external maximum power level. When the power consumption of the monitoring camera 101 is higher than the external maximum power level, the monitoring camera 101 may use power from the energy accumulator 105, and the amount of energy in the energy accumulator 105 will decrease. How this works in more detail will be described below.

A detector 108 is included in or connected to the monitoring camera 101. The detector 108 may be any suitably configured detector for detecting changes in an environment in which the camera 101 is located. For example, the detector 108 can be a motion detector of, e.g., an infra-red, IR, type or simply a sensor connected to a door close to or in the scene monitored by the monitoring camera 101. When the door opens the motion detector 108 transmits a signal to the monitoring camera 101 indicating that there will be or is motion in the scene. The motion detector 108 may also be a more or less remote sensing device and be placed outside the scene monitored by the monitoring camera 101. Other examples of a detector include a timer, an ambient light detector etc.

As described above the image data from the sensor 104 may be processed such that it is enhanced in the processor 106. The processor 106 may decide if the image data may be sent to the receiver 109 or not. This can be decided in a variety of ways. One way is to check for motion in the scene, and if there is no motion in the scene no image data is sent to the receiver 109. The receiver 109 may e.g. be a control station, a server or any other node for handling the image data from the monitoring camera 101. In the case with PoE the receiver 109 may be the same as the external power source 102.

Instead of sending the image data to the receiver 109, the image data may be stored on an image memory 110 and sent to the receiver 109 later. The image memory may be of any suitable type, such as a hard disk, optical storage or flash memory etc.

Figure 2A:
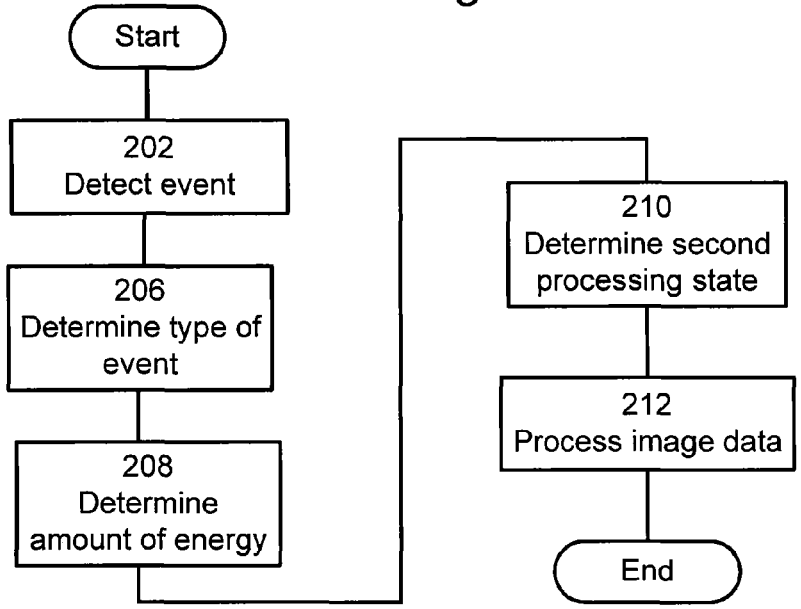
FIGS. 2a and 2b are flowcharts depicting embodiments of a method in the monitoring camera.
Figure 2B:
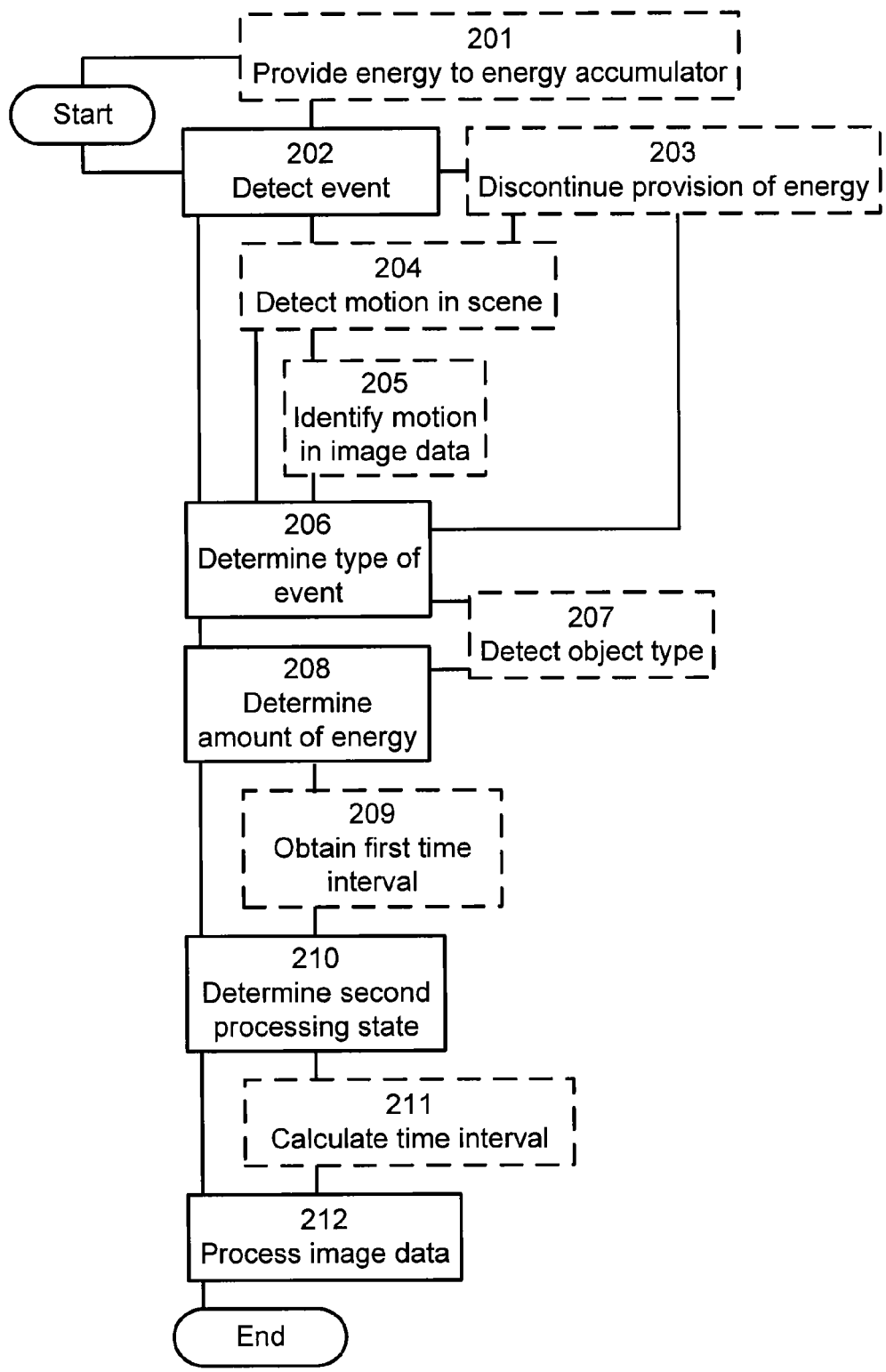
Figure 3:
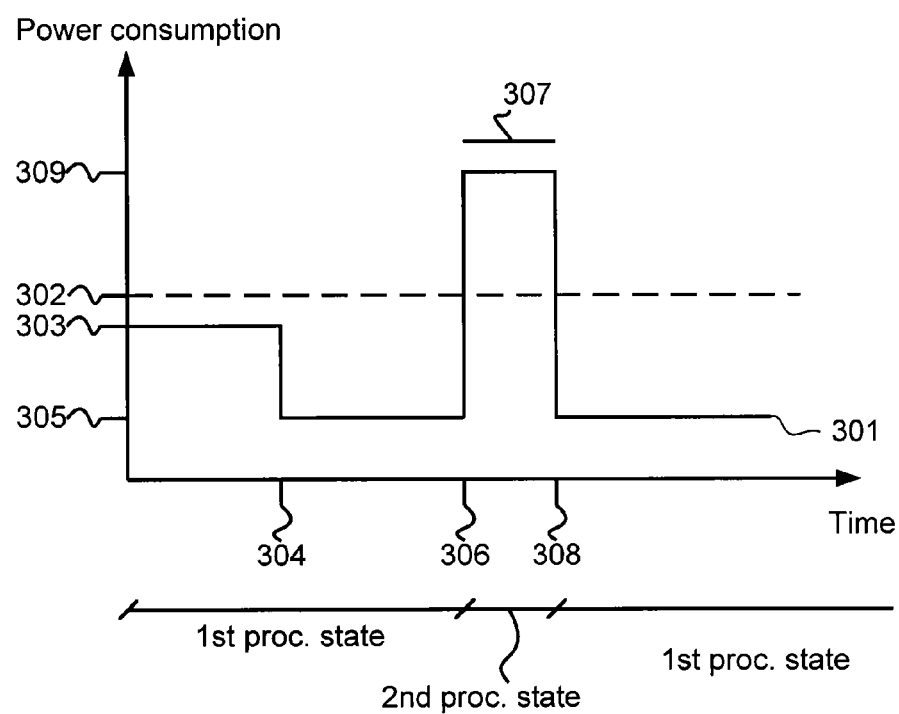
FIG. 3 is a diagram illustrating the power consumption of the monitoring camera.

Embodiments of a method in the monitoring camera 101 for improving the control and power management of the monitoring camera 101 will now be described with reference to the flowchart depicted in FIGS. 2a, 2b and FIG. 3 illustrating a diagram showing the power consumption 301 of the monitoring camera 101, and with continued reference to FIG. 1 The method comprises the following actions, which actions may be carried out in the described order as well as in other orders than described below. The actions may also be combined.

The method describes a way of controlling the monitoring camera 101. The monitoring camera 101 is connected to the external power source 102 having an external maximum power level 302. The camera 101 can be monitoring a scene, whereby image data is processed in a first processing state. More information about the first processing state will be described below.

The method can be embodied in a method as illustrated in FIG. 2a where the monitoring camera detects 202 an event and determines 206 a type of the detected event. An amount of energy in an energy accumulator is determined 208 in the monitoring camera. Based on the type of the event and based on the external maximum power level and based on the determined amount of energy in the energy accumulator, a second processing state is determined 210. The second processing state requires a power level that is higher than the external maximum power level. Image data is then processed 212 in the second processing state.

A more detailed illustration of embodiments of the invention is illustrated in FIG. 2b, where initially, the monitoring camera 101 is monitoring the scene. The controller determines that nothing of interest happens in the scene at the moment, i.e. no events are occurring. Details regarding how this is determined are known to the skilled person. The monitoring camera 101 is now in the first processing state and the power consumption 301 is below the external maximum power level 302. In this example the power consumption 301 of the monitoring camera is at a first power level 303. The first power level 303 is lower than or equal to the external maximum power level 302. When the monitoring camera 101 is in the first processing state, the monitoring camera 101 is performing a certain amount of processing of image data. This could for example mean a specific frame rate or level of noise filtering or sharpening etc. at which the monitoring camera 101 is recording.

At a first time instant 304 it is determined that the quality of the image data may be reduced in order to lower the power consumption 301 of the monitoring camera 101. A reason for this can e.g. be that it is determined that nothing of importance is occurring in the scene. The power consumption 301 of the monitoring camera 101 is then lowered to a second power level 305, while still being in the first processing state. In order to lower the power consumption 301 the monitoring camera 101 may e.g. reduce the frame rate, adjust a noise filtering level, adjust a tone mapping level, adjust a sharpening level, adjust a color correction level or adjust an artifact reduction level.

When the power consumption is lowered energy may be provided to the energy accumulator 105 at a power level corresponding to the difference between the external maximum power level 302 and the power level of the first processing state, as illustrated by an energy provision step 201. The power level of the first processing state may e.g. be the first power level 303 or the second power level 305.

The energy accumulator 105 is charged slowly over time. The reason why the charging should be made slowly over time is to make sure that it does not require too much power during charging.

At a second instant 306 an event is detected 202. The detected event may be several different kinds of event. Below a number of non-limiting examples will be provided. The event indicates that something has happened in the monitored scene that requires more processing power and thereby a higher power consumption 301 level in the monitoring camera 101 that is higher than the external maximum power level 302.

Typically, the event is something of importance that happens in the scene. However, it is also possible that the monitoring camera 101 receives a signal that triggers the event without anything specific happening in the monitored scene. In other words, the event triggering signal may be induced by a user and the signal may be received via a cable or via a wireless interface. For example, the event can be a timer that lapses, a timer that indicates that a specific time of day is reached, a detection that the ambient light is at a specific level, i.e. sunrise/sunset detection, etc.

If electrical power is provided to the energy accumulator 105 when the power consumption 301 is lower than the external maximum level 302, the provision of energy to the energy accumulator 105 is discontinued 203 as a consequence of the detection of the event.

As described in relation to action 202, the event may be that motion is detected 204 in the scene. Motion may be detected in the scene by receiving a signal from a detector in the form of a motion detector 108 as described in relation to FIG. 1.

The event may be detected by the monitoring camera 101 by identifying 205 motion in the image data. Motion in the image data may be identified by any appropriate motion detection algorithm/process known in the art.

A type of the detected event is determined 206. Non-limiting examples of event types include the event that a door opens in the scene. Another event type may be that a car passes through the scene monitored by the monitoring camera 101. Further examples, as mentioned above, include timer generated events and ambient light changes. The monitoring camera 101 will react differently depending on which event type that is detected. This will be described below in relation to action 210.

The monitoring camera 101 may detect 207 a predetermined object type in the image data. The object type may be a single object as well as a group of objects that may be identified in the scene. An example of an object type may be a face of a person, a vehicle number plate, a rising or setting sun etc.

The amount of energy in the energy accumulator 105 in the monitoring camera 101 is determined 208. How this is performed is well known to the skilled person and include more or less complex detection means and algorithms.

In some embodiments a time interval 307 is obtained 209 that is required for a second processing state. The determining of the second processing state may further be based on the time interval 307. In some embodiments it is determined that the monitoring camera 101 should monitor the scene between the second time instant 306 and a third time instant 308. In these embodiments the power consumption 301 of the monitoring camera 101 increases from a level, lower than the external maximum power level 302 to a third power level 309. The power consumption 301 of the monitoring camera 101 may be increased from the first power level 303 or from the second power level 305.

The time interval 307 may be based on the type of the detected event. For example if the detected event is that a door is opened in the scene, it may be determined that the scene should be monitored long enough to identify the person walking through the door.

Based on the type of the event, on the external maximum power level 302 and on the determined amount of energy in the energy accumulator 105 the second processing state is determined 210. The power level of the second processing state is higher than the external maximum power level 302. The power level of the second processing state may e.g. be the third power level 309.

In the second processing state, energy is provided to from both the external power source 102 and from the energy accumulator 105. This increased amount of power may be used to increase the quality of the image data and thus enhance the experience of the user watching the image data. In the first processing state image data may, e.g., be processed at a first frame rate or noise filtering level or tone mapping level or sharpening level or color correction level or artifact reduction level. Details regarding noise filtering, or tone mapping, sharpening, color correction, artifact reduction and other examples of types of processing are known in the art and therefore not described in detail here.

The second processing state comprises processing image data at a second frame rate or noise filtering level or tone mapping level or sharpening level or color correction level or artifact reduction level. The second frame rate or noise filtering level or tone mapping level or sharpening level or color correction level or artifact reduction level is better than the first frame rate or noise filtering level or tone mapping level or sharpening level or color correction level or artifact reduction level. In this way the experience of the user watching the image data is increased.

How the image data is processed in the second processing state may also depend on conditions in the scene. If the conditions are bad, e.g. if it is foggy or dark, more processing is required in the second processing state to increase the quality of the image data.

The image quality in the first processing state may be enough for the monitoring camera 101 to detect the event in the scene. While in the second processing state, the image quality may high enough to identify objects in the scene.

The time interval 307 for the second processing state may be calculated 211 by dividing the amount of energy in the energy accumulator 105 by the difference between the power level required for the second processing state 309 and the external maximum power level 302. The power level required for the second processing state 309 may e.g. be the third power level 309.

Image data is processed 212 in the second processing state. The image data may then be saved on the image memory 110 or sent to the receiver 109.

As indicated in FIG. 2b, a number of method steps 201, 203, 204, 205, 207, 209 and 211 are illustrated with dashed lines. This is to indicate that these steps are optional and that they can be combined in any number and in any appropriate manner and thereby define various embodiments of the method as defined by the steps 202, 206, 208, 210 and 212.

An embodiment of a monitoring camera that corresponds to the method is the camera 101 in FIG. 1. The monitoring camera 101 is configured to be connected to the external power source 102. The external power source 102 is limited to the external maximum power level 302. The monitoring camera 101 is configured to monitor the scene, whereby image data is being processed in the first processing state. The monitoring camera 101 comprises control circuitry 106 and memory circuitry 107. The control circuitry 106 and memory circuitry 107 is configured to detect the event and determine the type of the detected event. The control circuitry 106 and memory circuitry 107 is further configured to determine the amount of energy in the energy accumulator 105 in the monitoring camera 101. Based on the type of the event and based on the external maximum power level 302 and based on the determined amount of energy in the energy accumulator 105, a second processing state is determined. The power level of the second processing state 309 is higher than the external maximum power level 302. Image data is then processed in the second processing state.

The embodiments herein for controlling the monitoring camera 101 may be implemented through one or more processors in the controller 106, in the monitoring camera 101, together with computer program code for performing the functions and actions of the embodiments herein. The program code mentioned above may also be provided as a computer program product, for instance in the form of a data carrier carrying computer program code for performing the embodiments herein when being loaded into the electronic device 101. One such carrier may be in the form of a CD ROM disc. It is however feasible with other data carriers such as a memory stick. The computer program code may furthermore be provided as pure program code on a server and downloaded to the monitoring camera 101.

The monitoring camera 101 may comprise the memory circuitry 107 comprising one or more memory units. The memory circuitry 107 is arranged to be used to store data, received data streams, received information, configurations, schedules, and applications to perform the methods herein when being executed in the monitoring camera 101.

Those skilled in the art will also appreciate that the controller 106 and the memory circuitry 107 described above may refer to a combination of analog and digital circuits, and/or one or more processors configured with software and/or firmware, e.g. stored in a memory, that when executed by the one or more processors. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

When using the word "comprise" or "comprising" it shall be interpreted as non-limiting, i.e. meaning "consist at least of".

The embodiments herein are not limited to the above-described preferred embodiments. Various alternatives, modifications and equivalents may be used. Therefore, the embodiments should not be taken as limiting the scope of the invention, which is defined by the appended claims.

The invention claimed is:

1. A method for controlling a monitoring camera, the monitoring camera being connected to an external power source having a predetermined external maximum power level known to the camera, whereby image data is being processed in a first processing state requiring a power level that is lower than or equal to the predetermined external maximum power level, the method comprising:
providing energy to an energy accumulator of the monitoring camera at a power level corresponding to a difference between the external maximum power level and the power level of the first processing state,
detecting an event,
discontinuing the providing energy to the energy accumulator as a consequence of the detection of the event,
determining a type of the detected event,
determining an amount of energy in the energy accumulator,
determining based on the type of the event and based on the external maximum power level and based on the determined amount of energy in the energy accumulator, a second processing state requiring a power level that is higher than the external maximum power level, wherein the determining the second processing state comprises calculating a time interval for the second processing state by dividing the amount of energy in the energy accumulator by a difference between the power level required for the second processing state and the external maximum power level, and processing image data in the second processing state.

2. The method according to claim 1, wherein the time interval is calculated based on the type of the detected event.

3. The method according to claim 1, wherein the detecting an event comprises detecting motion in a scene being monitored.

4. The method according to claim 3, wherein the detecting motion comprises identifying motion in the image data.

5. The method according to claim 1, wherein the determining a type of the detected event comprises detecting a predetermined object type in the image data.

6. The method according to claim 1, wherein:
the first processing state comprises processing image data according to any first:
frame rate,
noise filtering level,
tone mapping level,
sharpening level,
color correction level,
artifact reduction level; and
the second processing state comprises processing image data according to any second:
frame rate,
noise filtering level,
tone mapping level,
sharpening level,
color correction level, and
artifact reduction level, being lower than the corresponding first rate and level.

7. A monitoring camera configured to be connected to an external power source having a predetermined external maximum power level known to the camera, and configured to process image data in a first processing state requiring a power level that is lower than or equal to the predetermined external maximum power level, the monitoring camera comprising circuitry configured to:
provide energy to an energy accumulator of the monitoring camera at a power level corresponding to a difference between the external maximum power level and the power level of the first processing state,
detect an event,
discontinue providing energy to the energy accumulator as a consequence of detecting the event,
determine a type of the detected event,
determine an amount of energy in the energy accumulator in the monitoring determine, based on the type of the event and based on the external maximum power level and based on the determined amount of energy in the energy accumulator, a second processing state requiring a power level that is higher than the external maximum power level, wherein the determination of the second processing state comprises calculating a time interval for the second processing state by dividing the amount of energy in the energy accumulator by a difference between the power level required for the second processing state and the external maximum power level, and
process image data in the second processing state.

8. A non-transitory computer program product loadable into a memory of a computerized monitoring camera, which when executed by the monitoring camera, causes the monitoring camera to perform the method of claim 1.

* * * * *